(12) United States Patent
Yoda

(10) Patent No.: US 7,769,696 B2
(45) Date of Patent: Aug. 3, 2010

(54) INFORMATION STORING APPARATUS

(75) Inventor: Akira Yoda, Kanagawa (JP)

(73) Assignee: Fujifilm Corporation, Tokyo ( * ) Notice: Subject to any disclaimer, the term of this patent is extended or adjusted under 35 U.S.C. 154(b) by 1032 days.

(21) Appl. No.: 10/736,675

(22) Filed: Dec. 17, 2003

(65) Prior Publication Data
US 2004/0139333 A1 Jul. 15, 2004

(30) Foreign Application Priority Data
Jan. 10, 2003 (JP) .............................. 2003-005109
Oct. 31, 2003 (JP) .............................. 2003-372722

(51) Int. Cl.
*G06Q 20/00* (2006.01)
(52) U.S. Cl. ........................................ 705/67; 713/186
(58) Field of Classification Search ............. 705/54–79; 726/2, 4–9, 16–21, 27, 28; 713/186; 902/3; 340/5.52, 5.53, 5.82–5.84; 382/115–127
See application file for complete search history.

(56) References Cited

U.S. PATENT DOCUMENTS

| | | | | |
|---|---|---|---|---|
| 5,526,428 A | * | 6/1996 | Arnold ........................ | 713/159 |
| 5,870,723 A | * | 2/1999 | Pare et al. ....................... | 705/39 |
| 6,031,910 A | * | 2/2000 | Deindl et al. ................. | 380/255 |
| 6,070,141 A | * | 5/2000 | Houvener et al. .............. | 705/1 |
| 6,105,027 A | * | 8/2000 | Schneider et al. .............. | 707/9 |

(Continued)

FOREIGN PATENT DOCUMENTS

| | | |
|---|---|---|
| JP | 2001-195146 | 7/2001 |
| JP | 2001-195146 A | 7/2001 |
| JP | 2001-202336 | 7/2001 |
| JP | 2001-257668 | 9/2001 |
| JP | 2001-257668 A | 9/2001 |
| JP | 2002-133384 | 5/2002 |
| JP | 2002-133384 A | 5/2002 |

OTHER PUBLICATIONS

"criterion." Collins English Dictionary. 2000. CredoReference [online]. [Retrieved on Jan. 17, 2008] [Retrieved from <http://www.credoreference.com/entry/2634677>].*
Rankl, et al., "Smart Card Handbook, 2nd Edition," John Wiley & Sons, Ltd, Sep. 18, 2000. All pages.*
Seiichi Ido, "IC card information distribution platform, key technology of the 21$^{st}$ century information society", The Telecommunication Association, May 10, 2001.

*Primary Examiner*—Andrew J. Fischer
*Assistant Examiner*—Jamie Kucab
(74) *Attorney, Agent, or Firm*—Birch, Stewart, Kolasch & Birch, LLP

(57) ABSTRACT

An information storing apparatus for judging who requests personal information and for setting an access level for the personal information for the requester. The information storing apparatus includes: a personal information storing section storing thereon the personal information which is to be disclosed to predetermined accessible persons; an accessible person information storing section storing thereon accessible person characteristic information indicating a physical characteristic of each of the plurality of accessible persons; a requester authentication section for receiving requester characteristic information indicating a physical characteristic of a requester who requests the personal information, and for performing authentication processing of the requester using the requester characteristic information and the accessible person characteristic information stored on the accessible person information storing section; an access level setting section for setting an access level, which is a level of the personal information to be disclosed to the requester, when the requester authentication section authenticates the requester as the accessible person; and a personal information output section for outputting a part of the personal information stored on the personal information storing section to the requester in accordance with the access level set-up by the access level setting section.

16 Claims, 14 Drawing Sheets

160

| ACCESSIBLE PERSON'S ID NUMBER | ACCESS LEVEL INFORMATION | AUTHENTICATION CRITERION |
|---|---|---|
| 001 | LEVEL A | 80% |
| | LEVEL B | 50% |
| | ⋮ | ⋮ |
| 002 | LEVEL C | 90% |
| | LEVEL D | 20% |
| | LEVEL E | 40% |
| | ⋮ | ⋮ |
| ⋮ | ⋮ | ⋮ |

U.S. PATENT DOCUMENTS

| | | | |
|---|---|---|---|
| 6,615,191 B1 * | 9/2003 | Seeley | 705/54 |
| 6,845,908 B2 * | 1/2005 | Morita et al. | 235/382 |
| 6,961,448 B2 * | 11/2005 | Nichols et al. | 382/115 |
| 2001/0016915 A1 * | 8/2001 | Sugano et al. | 713/201 |
| 2003/0225596 A1 * | 12/2003 | Richardson et al. | 705/2 |
| 2005/0197859 A1 * | 9/2005 | Wilson et al. | 705/2 |

\* cited by examiner

110

| ACCESSIBLE PERSON'S ID NUMBER | TEMPLATE FACE INFORMATION | ACCESS LEVEL INFORMATION |
|---|---|---|
| 001 | 001.XXX | MEDICAL INFORMATION |
| 002 | 002.XXX | FAMILY STRUCTURE |
| ⋮ | ⋮ | ⋮ |

| TITLE | ACCESS LEVEL INFORMATION |
|---|---|
| DOCTOR | MEDICAL INFORMATION |
| POLICE OFFICER | DRIVER'S LICENSE INFORMATION |
| ⋮ | ⋮ |

| ACCESSIBLE PERSON'S ID NUMBER | TEMPLATE FACE INFORMATION | TEMPLATE VOICEPRINT INFORMATION |
|---|---|---|
| 001 | 001.XXX | 001.YYY |
| 002 | 002.XXX | 002.YYY |
| 003 | 003.XXX | 003.YYY |
| ⋮ | ⋮ | ⋮ |

FIG. 11

| ACCESSIBLE PERSON'S ID NUMBER | ACCESS LEVEL INFORMATION | AUTHENTICATION CRITERION |
|---|---|---|
| 001 | MEDICAL INFORMATION | 80% |
| 002 | DRIVER'S LICENSE INFORMATION | 50% |
| 003 | FAMILY STRUCTURE | 65% |
| ⋮ | ⋮ | ⋮ |

| TITLE | ACCESS LEVEL INFORMATION | AUTHENTICATION CRITERION |
|---|---|---|
| DOCTOR | MEDICAL INFORMATION | 80% |
| POLICE OFFICER | DRIVER'S LICENSE INFORMATION | 50% |
| ⋮ | ⋮ | ⋮ |

| ACCESSIBLE PERSON'S ID NUMBER | ACCESS LEVEL INFORMATION | AUTHENTICATION CRITERION |
|---|---|---|
| 001 | LEVEL A | 80% |
| | LEVEL B | 50% |
| | ⋮ | ⋮ |
| 002 | LEVEL C | 90% |
| | LEVEL D | 20% |
| | LEVEL E | 40% |
| | ⋮ | ⋮ |
| ⋮ | ⋮ | ⋮ |

FIG. 14

INFORMATION STORING APPARATUS

This patent application claims priority from a Japanese patent application No. 2003-005109 filed on Jan. 10, 2003, and a Japanese patent application No. 2003-372722 filed on Oct. 31, 2003, the contents of which are incorporated herein by reference.

BACKGROUND OF THE INVENTION

1. Field of the Invention

The present invention relates to an information storing apparatus storing thereon information. More particularly, the present invention relates to an information storing apparatus for setting access level for information for a person other than the owner of the apparatus.

2. Description of Related Art

A plurality of cards, such as an ATM card, a credit card, and a patient's registration card of a medical institution, are retained by a person. Research and development for integrating the cards into an IC card has been undertaken recently. (Cf. Seiichi Ido (ed.), "IC card information distribution platform, key technology of the 21st century information society", The Telecommunication Association, May 10, 2001).

The integrated IC card stores personal information. In this case, in order to provide protection of privacy of the IC card, it is necessary to set the access level for the personal information for the requester. Furthermore, it is necessary to prevent impersonation for acquiring the personal information.

SUMMARY OF THE INVENTION

Therefore, it is an object of the present invention to provide an information storing apparatus which can solve the foregoing problems. The above and other objects can be achieved by combinations described in the independent claims. The dependent claims define further advantageous and exemplary combinations of the present invention.

According to a first aspect of the present invention, there is provided an information storing apparatus storing thereon owner's personal information. The information storing apparatus includes: a personal information storing section storing thereon the personal information which is to be disclosed to predetermined accessible persons; an accessible person information storing section storing thereon accessible person characteristic information indicating a physical characteristic of each of the plurality of accessible persons; a requester authentication section for receiving requester characteristic information indicating a physical characteristic of a requester who requests the personal information, and for performing authentication processing of the requester using the requester characteristic information and the accessible person characteristic information stored on the accessible person information storing section; an access level setting section for setting an access level, which is a level of the personal information to be disclosed to the requester, when the requester authentication section authenticates the requester as the accessible person; and a personal information output section for outputting a part of the personal information stored on the personal information storing section to the requester in accordance with the access level set-up by the access level setting section.

Moreover, the information storing apparatus may further include an access level storing section storing thereon a personal information level, which is a level of the personal information to be disclosed to the accessible person, in association with each of the plurality of the accessible persons, and the access level setting section may set the access level to the personal information level corresponding to the accessible person when the requester authentication section authenticates the requester as the accessible person.

Moreover, the information storing apparatus may further include an access level storing section storing thereon a personal information level, which is a level of the personal information to be disclosed to the accessible person, and an authentication criterion, which is strictness of the authentication to be performed when the personal information within the personal information level is disclosed, in association with each other, and the access level setting section may determine the personal information level corresponding to the authentication criterion as at least a part of the access level when the requester authentication section authenticates the requester by the authentication criterion or a criterion stricter than the authentication criterion.

Moreover, the requester authentication section may receive the authentication criterion from the access level storing section, the authentication criterion corresponding to the personal information level for the personal information requested from the requester, and the requester authentication section may perform authentication processing of the requester by the authentication criterion.

Moreover, the access level storing section may store the plurality of personal information levels and also stores a lower limit of credibility of the authentication as the authentication criterion corresponding to each of the personal information levels. The requester authentication section may output the credibility of the authentication for the requester based on the result of the comparison of the requester characteristic information with the accessible person characteristic information. The access level setting section may select the personal information level of which the lower limit of the corresponding credibility is less than the credibility of the authentication output by the requester authentication section, and sets the access level to the sum of the selected personal information levels.

Moreover, the access level storing section may store the personal information level and the authentication criterion in association with a title of the requester. The requester authentication section may further receive the title of the requester from a belonging of the requester, and performs authentication processing of the requester using the authentication criterion by reading the authentication criterion corresponding to the received title from the access level storing section. The access level setting section may set the access level to the personal information level corresponding to the title of the requester when the requester authentication section authenticates the requester as the accessible person.

Moreover, the accessible person information storing section may store a plurality of accessible person characteristic information of each of the accessible persons, and the requester authentication section may receive a plurality of requester characteristic information, and performs authentication processing of the requester using the plurality of accessible person characteristic information and the plurality of requester characteristic information.

Moreover, the information storing apparatus may be retained by the owner.

Moreover, the requester authentication section may employ face information as the requester characteristic information and the accessible person characteristic information. Moreover, the information storing apparatus may further include an image capturing section for generating the requester characteristic information by capturing an image of the requester. Moreover, the requester authentication section may receive the requester characteristic information from a portable apparatus retained by the requester, and the personal information output section may output the personal information to the portable apparatus retained by the requester and causes the portable apparatus to store the personal information.

According to a second aspect of the present invention, there is provided an information storing apparatus storing thereon an owner's personal information. The information storing apparatus includes: a personal information storing section storing thereon the personal information which is to be disclosed; an authentication processing section, which is a requester authentication section for performing authentication processing of the requester using requester characteristic information indicating a physical characteristic of the requester, the authentication processing section receiving a title of the requester from a belonging of the requester, and performing the authentication processing by a predetermined strictness of the authentication corresponding to the title; an access level setting section for setting a level of the personal information to be disclosed to the requester to a level of the personal information predetermined corresponding to the title when the requester authentication section authenticates the requester as the accessible person; and a personal information output section for outputting a part of the personal information stored on the personal information storing section to the requester in accordance with the access level set-up by the access level setting section.

The summary of the invention does not necessarily describe all necessary features of the present invention. The present invention may also be a sub-combination of the features described above.

BRIEF DESCRIPTION OF THE DRAWINGS

FIG. 3 is a table showing data stored on an accessible person information storing section.

FIG. 9 is a table showing data stored on the accessible person information storing section according to the third alternative.

FIG. 11 is a table indicating data stored on the accessible person information storing section.

FIG. 12 is a table indicating data stored on the access level storing section.

FIG. 13 is a table indicating another example of data stored on the access level storing section.

FIG. 14 is a table indicating yet another example of the data stored on the access level storing section.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
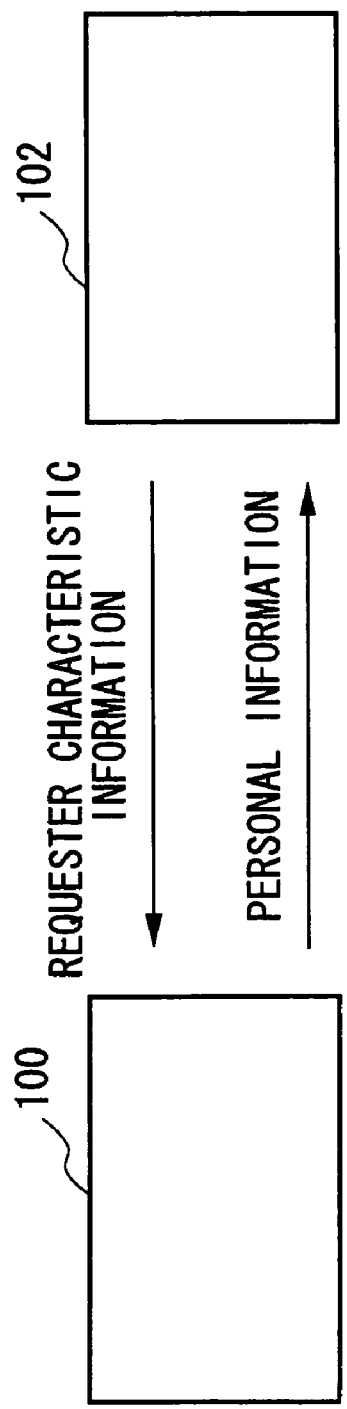
FIG. 1 is a conceptual diagram of an owner's IC card.

FIG. 1 is a conceptual diagram of an owner's IC card 100 according to an embodiment of the present invention. The owner's IC card 100 stores a plurality of kinds of owner's personal information. Then, a person who requests the owner's personal information (to be referred to as "requester" hereinafter) is authenticated using face information on the requester, and the access level for the personal information for the requester is set up. Here, the access level is a level of the personal information to be disclosed to a requester.

The owner's IC card 100 receives face information indicating characteristic of the face of the requester, e.g., a face image, from a requester's IC card 102 retained by the requester on radio, for example.

The owner's IC card 100 collates the received face information with template face information stored on the owner's IC card 100 to identify the requester. Then, the owner's IC card 100 sets up the access level for the personal information for the requestor and transmits a part of the personal information, which is allowed to be output in accordance with the set-up access level, to the requester's IC card 102 on radio, for example.

In this way, when setting the access level for the personal information, the owner's IC card 100 authenticates the requester based on the face information on the requester. For this reason, a person who does not have the authority for acquiring the personal information is not able to impersonate a requester having the acquisition authority.

Moreover, the owner's IC card 100 receives requester characteristic information from a predetermined IC card, i.e., the requester's IC card 102. Therefore, the owner's IC card 100 does not output the personal information to a person who does not retains the predetermined IC card.

In addition, the owner's IC card 100 is an example of the information storing apparatus storing thereon the owner's personal information in advance, and is retained by the owner. Moreover, the requester's IC card 102 is a portable apparatus retained by the requester, and includes the same or similar function as/to that of the owner's IC card 100. In another example, a portable remote terminal, such as PDA and a portable telephone, is used as the information storing apparatus instead of the owner's IC card 100 and/or the requester's IC card 102.

Moreover, the face information on the requester received from the requester's IC card 102 is an example of the requester characteristic information indicating physical characteristic of the requester. Alternatively, the owner's IC card 100 receives data indicating characteristic of the face of the requester as the face information. Moreover, the template face information stored on the owner's IC card 100 is an example of the accessible person characteristic information indicating the physical characteristic of the accessible person. Alternatively, the owner's IC card 100 stores data indicating face image of the requester or characteristic of the face of the requester as the template face information.

Figure 2:
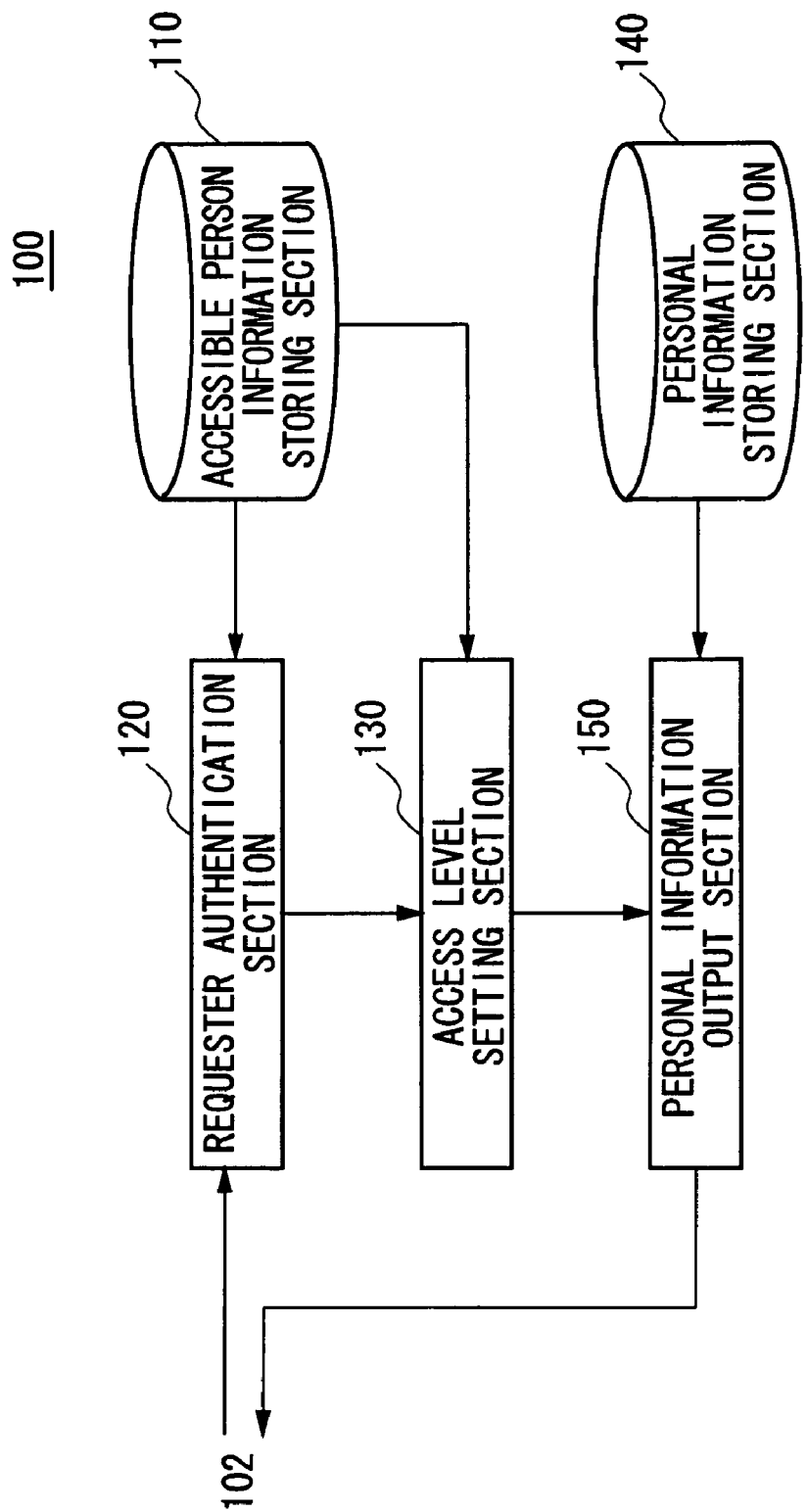
FIG. 2 is a block diagram showing a configuration of the owner's IC card.

FIG. 2 is a block diagram showing a configuration of the owner's IC card 100. The owner's IC card 100 includes an accessible person information storing section 110, a requester authentication section 120, an access level setting section 130, a personal information storing section 140, and a personal information output section 150.

The accessible person information storing section 110 also functions as an access level storing section, and stores the access level information and the template face information in association with each of a plurality of accessible persons, to whom the personal information is to be disclosed. The access level information indicates the level of the personal information to be disclosed to the associated accessible person (to be referred to as "personal information level" hereinafter).

The requester authentication section 120 receives the face information on the requester from the requester's IC card 102. Then, the requester authentication section 120 performs authentication processing using the received face information and the template face information stored on the accessible person information storing section 110, and judges whether the requester is an accessible person.

When the requester is authenticated, the access level setting section 130 sets the access level for the requester based on the access level information stored on the accessible person information storing section 110. For example, the access level setting section 130 sets the access level to the personal information level indicated in the access level information. Accordingly, when the requester authentication section 120 authenticates the requester as an accessible person, the access level setting section 130 sets the access level to the personal information level corresponding to the accessible person.

The personal information storing section 140 stores the personal information on the owner of the owner's IC card 100. Alternatively, the personal information storing section 140 stores the personal information to be disclosed to a predetermined accessible person. The personal information output section 150 transmits a part of the personal information stored on the personal information storing section 140, which is allowed to be output in accordance with the access level set-up by the access level setting section 130, to the requester's IC card 102, and causes the requester's IC card 102 to store the part of the personal information.

By including such the compositions, the owner's IC card 100 authenticates the requester based on the face information on the requester and sets the access level for the personal information for the requester, so that a part of the personal information, which is allowed to be output in accordance with the set-up access level, is transmitted to the requester's IC card 102.

Details of the accessible person information storing section 110 will be explained later using a table. Moreover, details of operation of the requester authentication section 120, the access level setting section 130, and the personal information output section 150, will be explained later using a flow chart.

FIG. 3 is a table showing data stored on the accessible person information storing section 110. The accessible person information storing section 110 associates an ID number of accessible persons with the template face information on each of the accessible persons, and stores them. Accordingly, the accessible person information storing section 110 stores the template face information on a plurality of accessible persons in advance. Therefore, when the requester authentication section 120 acquires the ID number from the requester, the requester authentication section 120 selects the template face information used for the authentication of the requester from the accessible person information storing section 110 based on the ID number.

Moreover, the accessible person information storing section 110 stores the access level information in association with the ID number of each of the plurality of accessible persons. Each access level information indicates the personal information level to be disclosed for a corresponding accessible person. Therefore, when the ID number of the requester is acquired, the access level setting section 130 selects the personal information level to be disclosed to the requester from the accessible person information storing section 110 based on the ID number.

In addition, the access level information designates kinds of personal information, such as for example, medical information and family structure. In another example, the access level information designates an address of the personal information storing section 140 in which the personal information is stored.

Figure 4:
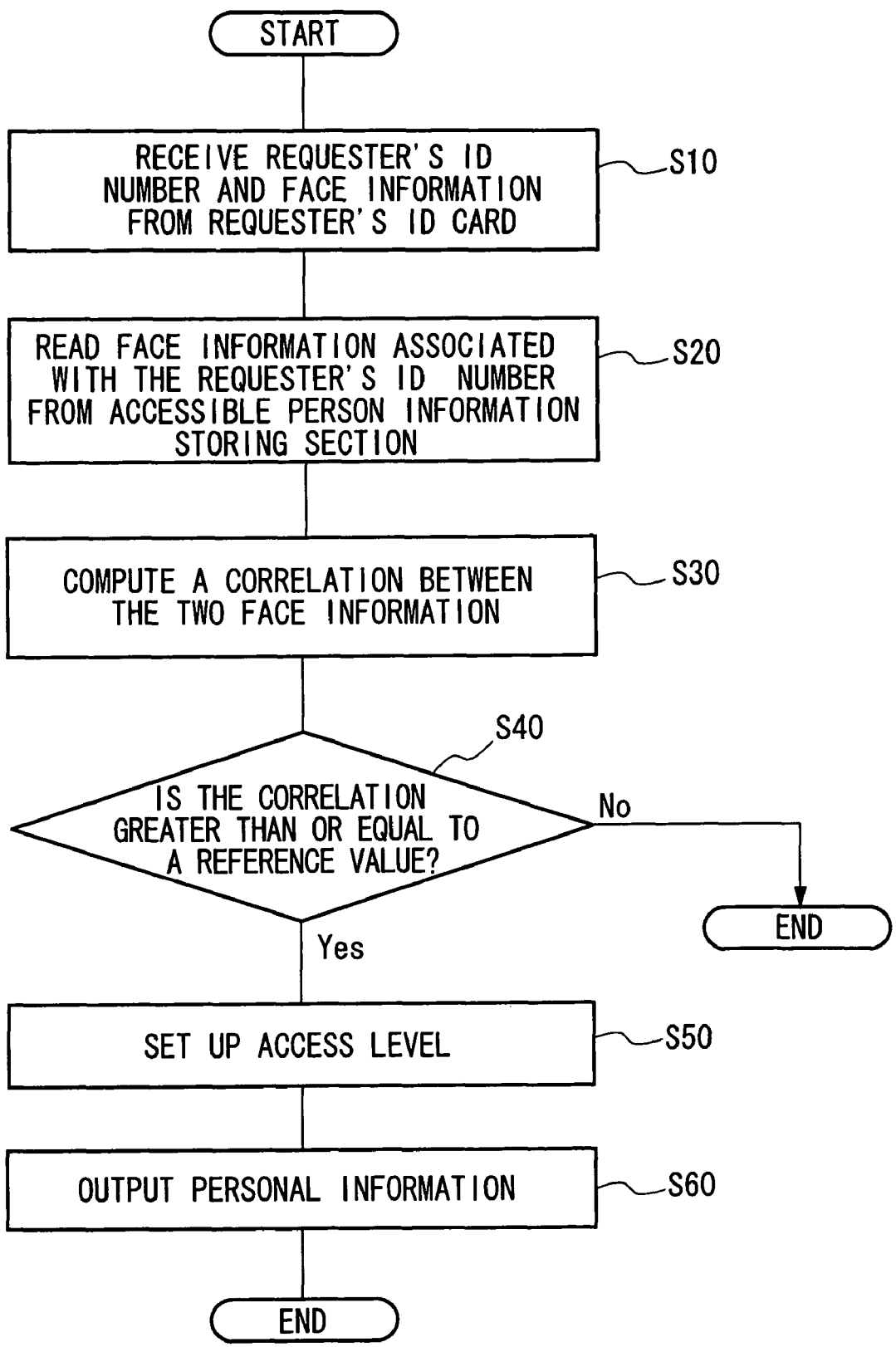
FIG. 4 is a flow chart showing an operation of the owner's IC card.

FIG. 4 is a flow chart of an operation of the owner's IC card 100 when the owner's IC card 100 outputs the personal information to the requester's IC card 102. The requester authentication section 120 of the owner's IC card 100 receives the ID number of the requester and the face information of the requester from the requester's IC card 102 (S10). Then, the requester authentication section 120 selects and reads the template face information from the accessible person information storing section 110 based on the ID number of the requester (S20), and computes a correlation between the face information received from the requester's IC card 102 and the template face information (S30). If the computed correlation is greater than or equal to a predetermined reference value (S40: Yes), the requester authentication section 120 judges that the requester is the accessible person and authenticates the requester.

By this operation, the requester authentication section 120 authenticates the requester using the face information.

Then, based on the ID number of the authenticated requester, the access level setting section 130 reads the access level information corresponding to the accessible person identified by the ID number from the accessible person information storing section 110. Then, the access level setting section 130 sets the access level based on the read access level information (S50).

The personal information output section 150 outputs a part of the personal information, which is allowed to be output in accordance with the set-up access level, to the requester's IC card 102 (S60). Alternatively, the personal information output section 150 outputs the information indicating that the requester has been authenticated to the requester's IC card 102 before outputting the personal information. In this case, the requester's IC card 102 requests a part of the personal information to the output section 150, and the personal information output section 150 outputs only a part of the personal information, which is allowed to be output to the requester's IC card 102 in accordance with the set-up access level, among the part of the personal information requested by the requester's IC card 102.

Although the face information is employed as the requester characteristic information in the above-described embodiment, it is also possible to use fingerprint information indicating characteristic of a fingerprint of the requester, palm-print information indicating characteristic of a palm print of the requester, voiceprint information indicating characteristic of a voiceprint of the requester, etc. as the requester characteristic information.

Moreover, although the personal information output section 150 outputs the personal information to the requester's IC card 102, the personal information output section 150 may output the personal information to any equipment other than the requester's IC card 102.

Figure 5:
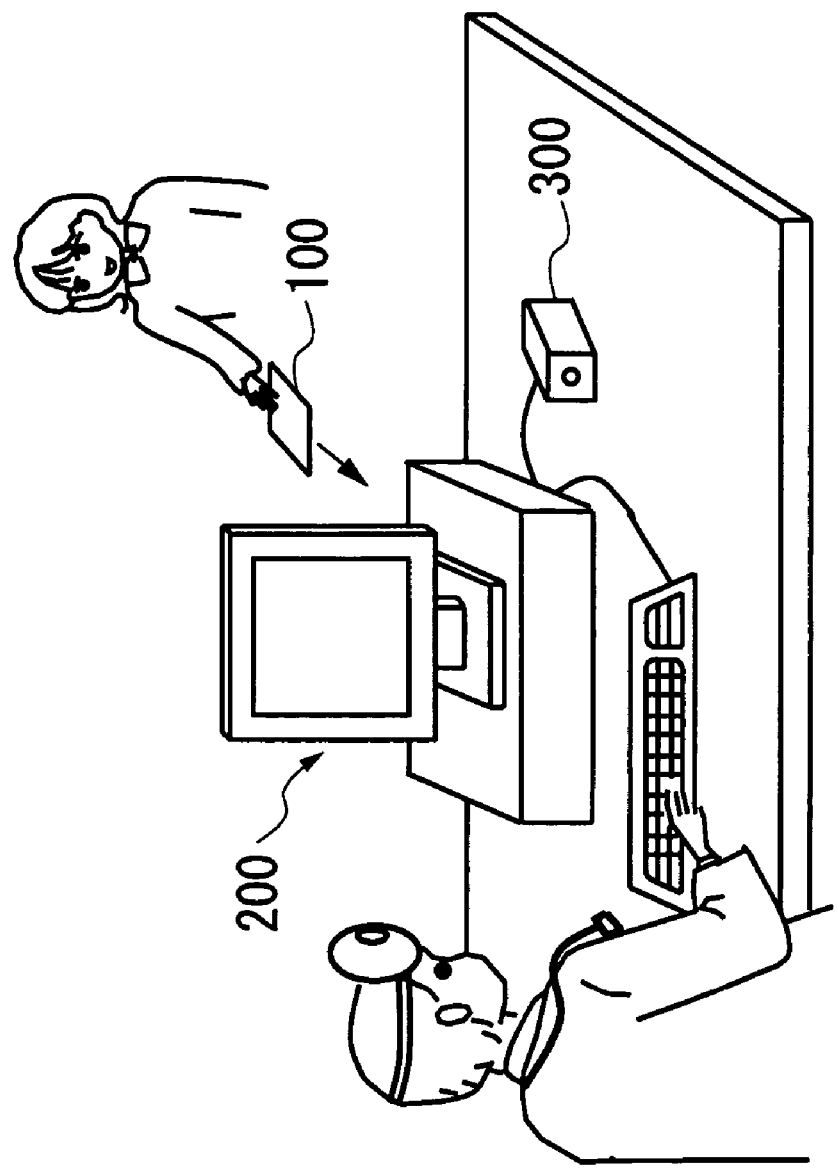
FIG. 5 is a schematic diagram of a first alternative of the owner's IC card.

FIG. 5 is a schematic diagram of the first alternative of the owner's IC card 100. In this alternative, the owner's IC card 100 is used with an information displaying apparatus 200 and an image capturing apparatus 300. For example, the information displaying apparatus 200 and the image capturing apparatus 300 are installed in a consultation room of a hospital etc.

The owner of the IC card inserts the owner's IC card 100 into the information displaying apparatus 200. The requester inputs the requester's ID number into the information displaying apparatus 200.

The information displaying apparatus 200 causes the image capturing apparatus 300 to capture an image of the requester's face and to generate face information of the requester. Then, the information displaying apparatus 200 outputs the face information on the requester and the ID number of the requester to the requester authentication section 120 of the owner's IC card 100.

The requester authentication section 120 of the owner's IC card 100 selects the template face information from the accessible person information storing section 110 based on the received ID number of the requester. Then, authentication processing of the requester is performed based on the selected template face information and the face information received from the information displaying apparatus 200.

After the authentication processing is completed and the access level for the personal information has been set, the requester requests the personal information output section 150 of the owner's IC card 100 to output the personal information through the information displaying apparatus 200. The personal information output section 150 outputs the personal information to the information displaying apparatus 200 if the personal information is allowed to be output in accordance with the set-up access level. Then, the information displaying apparatus 200 displays the personal information.

According to the first alternative, the requester is authenticated by collating the face information generated at the time of the requisition of the personal information with the template face information. Therefore, a person who has not been registered on the accessible person information storing section 110 cannot impersonate the registered person, and cannot acquire the personal information.

Figure 6:
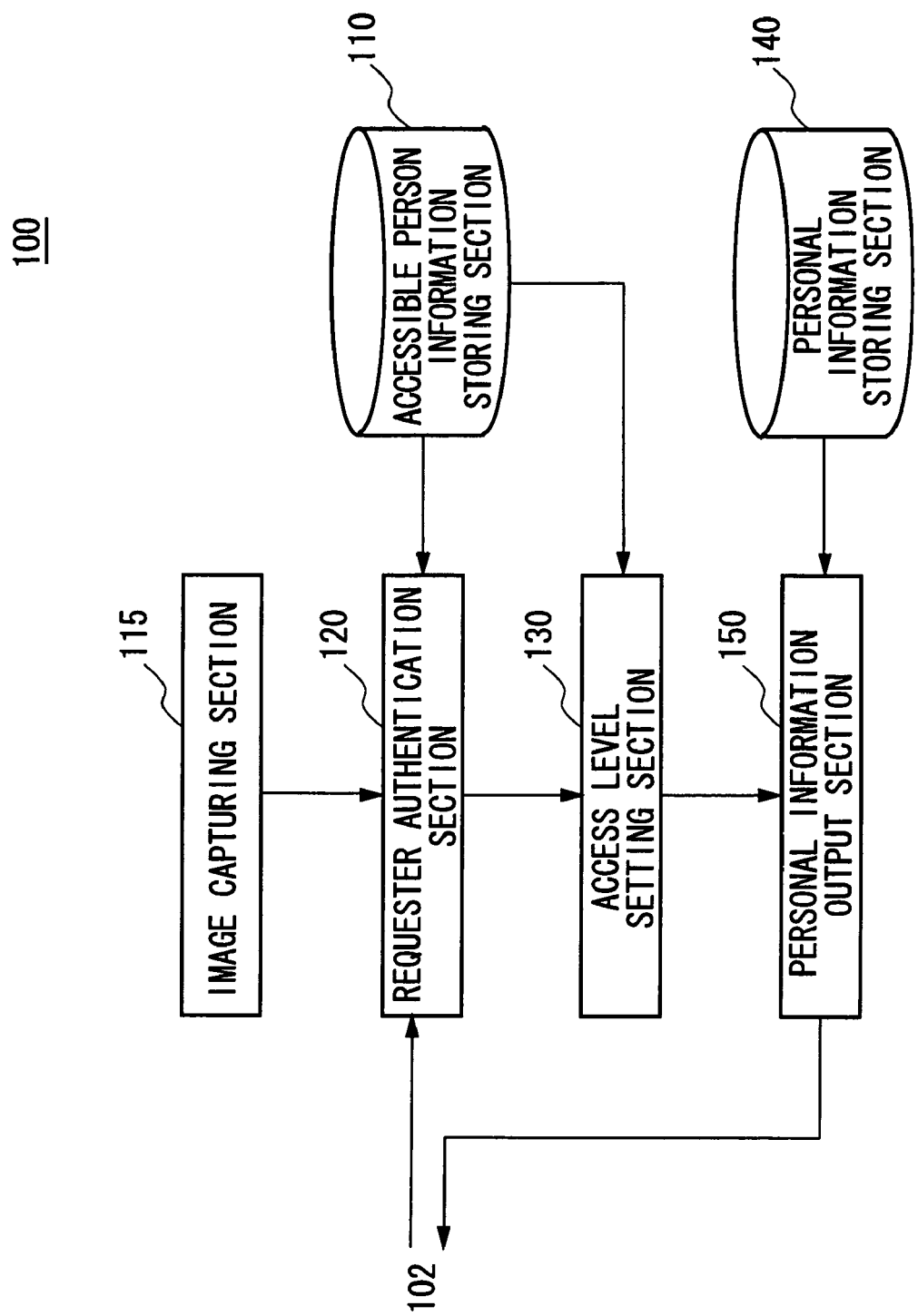
FIG. 6 is a block diagram of a second alternative of the owner's IC card.

FIG. 6 is a block diagram of a second alternative of the owner's IC card 100. In the second alternative, the owner's IC card 100 further includes an image capturing section 115. When a requester requests the personal information, the image capturing section 115 captures an image of the requester, and generates face information of the requester.

Moreover, the requester authentication section 120 acquires the ID number of the requester from the requester's IC card 102 or the input section (not shown), and selects the template face information from the accessible person information storing section 110. Then, a correlation between the face information generated by the image capturing section 115 and the template face information is computed, and then the requester is authenticated. If the requester is authenticated, the access level setting section 130 sets the access level of the personal information for the requester.

According to the second alternative, the requester authentication section 120 authenticates the requester using the face information generated when the personal information is requested. Therefore, a person who is not registered on the accessible person information storing section 110 cannot impersonate a person who is registered, and cannot acquire the personal information. Moreover, since the image capturing section 115 of the owner's IC card 100 generates the face information on the requester, an external image capturing apparatus is not needed when authenticating the requester.

Moreover, since the image capturing section 115 of the owner's IC card 100 generates the face information on the requester, an external image capturing apparatus is not needed when authenticating the requester. Therefore, the owner's IC card 100 sets the access level for the personal information and outputs the personal information at any place.

Figure 7:
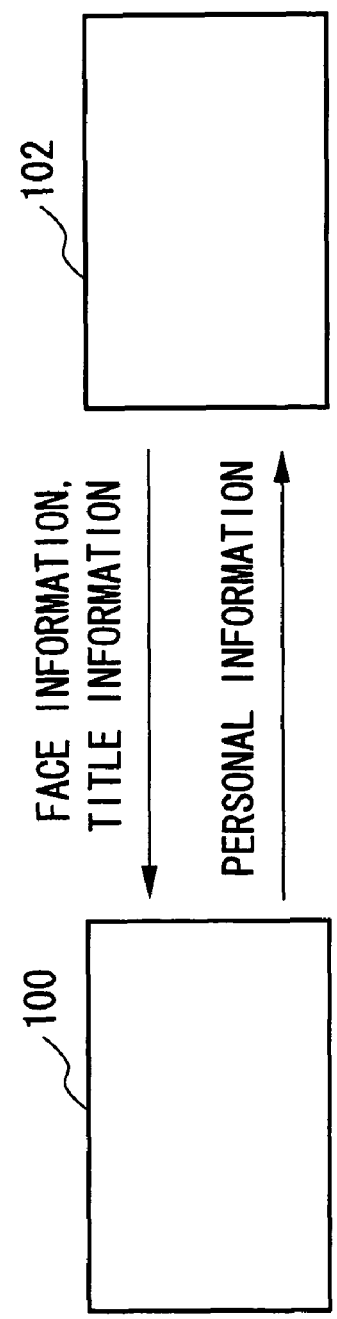
FIG. 7 is a conceptual diagram of a third alternative of the owner's IC card.
Figure 8:
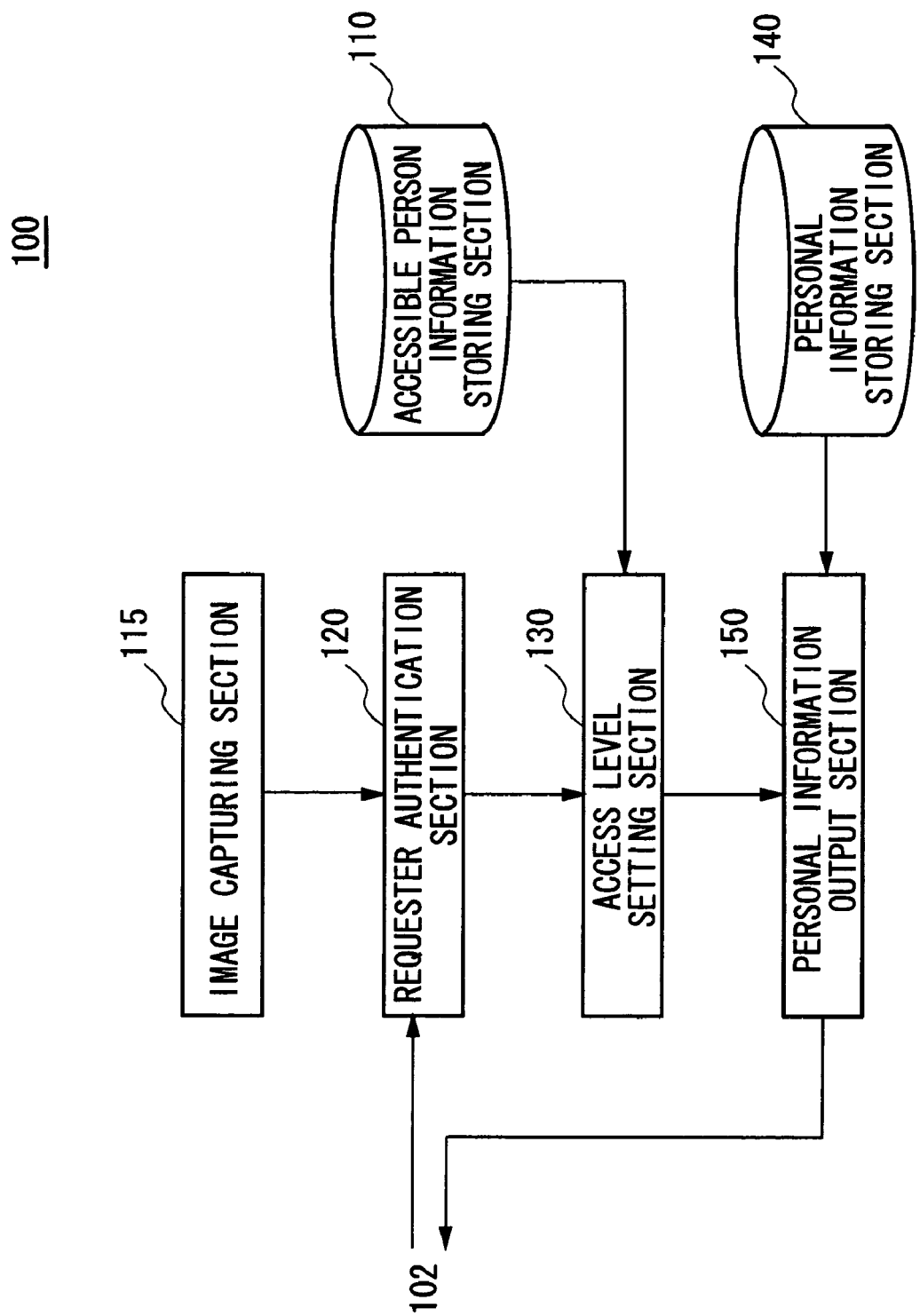
FIG. 8 is a block diagram showing a configuration of the owner's IC card according to the third alternative.

FIG. 7 is a conceptual diagram of a third alternative of the owner's IC card 100, and FIG. 8 is a block diagram showing a configuration of the owner's IC card 100 according to the third alternative. In the third alternative, the requester authentication section 120 of the owner's IC card 100 receives the face information and information indicating title of the requester from the requester's IC card 102 on radio, for example. Here, the title is information indicating a category to which a user belongs, e.g., a doctor, a pharmacist, a hygienist, a police officer, a lawyer, a teacher, etc. Moreover, the owner's IC card 100 further includes an image capturing section 115, which is an example of a physical information acquiring section. The image capturing section 115 captures an image of the face of the requester who retains the requester's IC card 102, and generates face information. In this case, the requester authentication section 120 collate the face information generated by the image capturing section 115 with the face information acquired from the requester's IC card 102, and then the requester is authenticated. If the requester authentication section 120 authenticates the requester, the access level setting section 130 judges that the information indicating the title acquired from the requester's IC card 102 is authentic, and sets the access level for the personal information in accordance with the information indicating the title.

According to the third alternative, the access level for the personal information for the requester is set in accordance with the title of the requester after the requester has been authenticated. Therefore, a person who does not have the title cannot impersonate a person who has the title, and cannot acquire the personal information.

Alternatively, the owner's IC card 100 omits the image capturing section 115 and receives the face information of the requester generated by an external image capturing apparatus. In this case, the requester authentication section 120 collates the face information generated by the external image capturing apparatus with the face information of the requester received from the requester's IC card 102, and authenticates the requester.

Alternatively, the requester authentication section 120 authenticates the requester using fingerprint information indicating characteristic of a fingerprint or voiceprint information indicating characteristic of a voiceprint instead of the face information.

FIG. 9 is a table showing data stored on the accessible person information storing section 110 according to the present alternative. The accessible person information storing section 110 stores the information indicating the access level in association with the information indicating the title. By this, the access level setting section 130 sets the access level for the personal information for the requester in accordance with the title of the requester.

Figure 10:
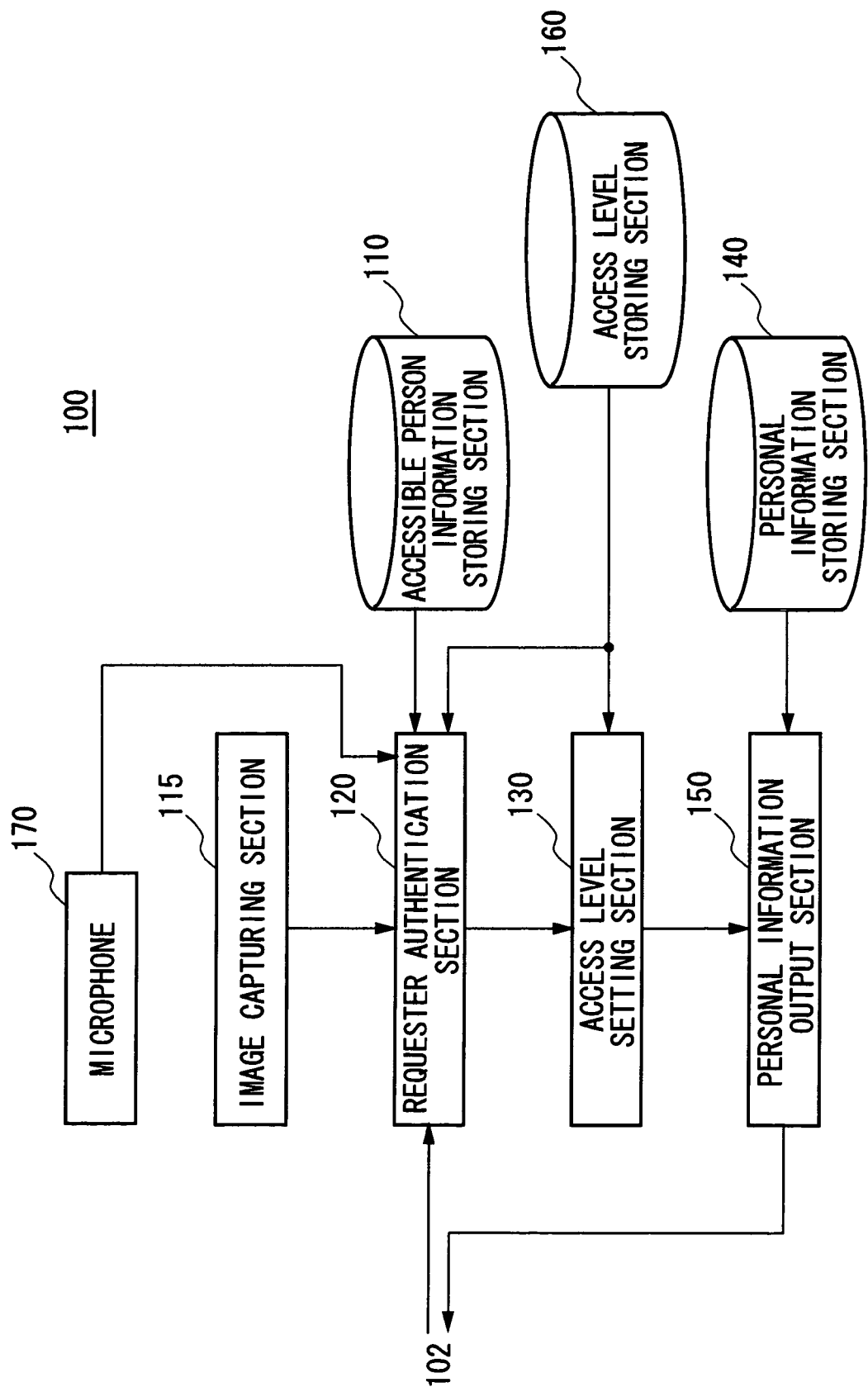
FIG. 10 is a block diagram of the owner's IC card.

FIGS. 10, 11, and 12 shows a fourth alternative of the owner's IC card 100. FIG. 10 is a block diagram of the owner's IC card 100. Except for the below-described explanation, since a component depicted in FIG. 10 which bears the same reference numeral as the component depicted in FIG. 6 has the similar function to the component depicted in FIG. 6, the explanation of such a component will be omitted.

In the present alternative, the owner's IC card 100 authenticates the requester using a plurality of physical characteristics received from the requester. In addition to the configuration of the owner's IC card 100 explained using FIG. 6, the owner's IC card 100 further includes an access level storing section 160 and a microphone 170. The access level storing section 160 stores the access level information. Moreover, the microphone 170 receives voice of the requester and generates voiceprint information on the requester.

FIG. 11 is a table indicating the data stored on the accessible person information storing section 110 in the present alternative. In the present alternative, the accessible person information storing section 110 stores the template face information and the template voiceprint information on the accessible person in association with the ID number of the accessible person. For examples, the template voiceprint information is information identifying the voiceprint of the corresponding accessible person. Moreover, the template face information and the template voiceprint information are examples of the accessible person characteristic information. Therefore, in the present alternative, the accessible person information storing section 110 stores a plurality of accessible person characteristic information on each accessible person in advance. Alternatively, the accessible person information storing section 110 stores other kinds of accessible person characteristic information, such as fingerprint information and palm print information instead of the template face information and the template voiceprint information.

Then, when the requester authentication section 120 performs authentication processing, the accessible person information storing section 110 supplies the template face information and the template voiceprint information to the requester authentication section 120. Accordingly, the requester authentication section 120 receives a plurality of accessible person characteristic information. Moreover, the requester authentication section 120 receives the face information generated by the image capturing section 115 and the voiceprint information generated with the microphone 170 as a plurality of requester characteristic information corresponding to the accessible person characteristic information. Then, the requester authentication section 120 performs authentication processing of the requester using the plurality of accessible person characteristic information and the plurality of requester characteristic information.

In the authentication processing, the requester authentication section 120 computes the credibility of the authentication by comparing the plurality of accessible person characteristic information and the plurality of requester characteristic information. In this computation, the requester authentication section 120 computes the correlation between each of the plurality of accessible person characteristic information and each of the plurality of requester characteristic information. Then, the requester authentication section 120 computes the credibility of the authentication based on the computed correlation and standard deviation of sampling distribution of the physical characteristic. For example, the standard deviation is statistically computed in advance for the physical characteristic corresponding to each of the requester characteristic information.

Then, the requester authentication section 120 compares the computed credibility of the authentication with a predetermined authentication criterion. Then, when the computed credibility of the authentication is greater than the authentication criterion, the requester authentication section 120 authenticates the requester as the accessible person.

Alternatively, the requester authentication section 120 computes the credibility of the authentication about each of the plurality of physical characteristics. Then, when the credibility corresponding to one of physical characteristics is greater than the authentication criterion, for example, the requester authentication section 120 authenticates the requester as the accessible person. Moreover, the requester authentication section 120 may perform authentication processing of the requester based on the plurality of credibility of the authentication corresponding to the plurality of physical characteristics.

In this way, in the present alternative, the requester authentication section 120 authenticates the requester using the plurality of physical characteristics. Therefore, even if one physical characteristic of the requester is so characterless that it is difficult to distinguish the requester from many persons who resemble the requester in the physical characteristic, the requester can be authenticated appropriately by using another physical characteristic.

FIG. 12 is the table indicating the data stored on the access level storing section 160 in the present alternative. The access level storing section 160 stores the access level information and the authentication criterion in association with the ID number of the accessible person. Accordingly, the access level storing section 160 stores the personal information level and the authentication criterion in association with each other.

Here, the access level information indicates the personal information level to be disclosed to the corresponding accessible person, for example. Moreover, the authentication criterion is strictness of the authentication when the personal information within the personal information level indicated in the corresponding access level information is to be disclosed, for example.

Moreover, in the present alternative, the access level storing section 160 stores a plurality of access level information corresponding to the plurality of accessible persons. Moreover, the access level storing section 160 stores the lower limit of the credibility of the authentication as an authentication criterion corresponding to each of the access level information.

Here, if a request for disclosure of the personal information is received from the requester, the requester authentication section 120 designates the access level information indicating the personal information level for the requested personal information, and reads the authentication criterion corresponding to the access level information from the access level storing section 160. Accordingly, the requester authentication section 120 receives the authentication criterion corresponding to the personal information level for the personal information requested from the requester from the access level storing section 160. Then, the requester authentication section 120 performs authentication processing of the requester using the received authentication criterion.

Accordingly, different authentication criteria can be used according to the levels of the personal information to be disclosed. In this case, the requester can be authenticated with the required accuracy according to sensitivity and importance of the personal information, for example. It is preferable that the access level storing section 160 stores a higher authentication criterion for the sensitive information, such as medical information, for example. According to the present alternative, the personal information can be protected appropriately.

FIG. 13 is a table indicating another example of the data stored on the access level storing section 160 in the present alternative. In this example, the access level storing section 160 stores the access level information and the authentication criterion in association with the title of the requester. Moreover, the requester authentication section 120 receives the ID number of the requester and the title of the requester from the requester's IC card 102. Alternatively, the requester authentication section 120 receives the title of the requestor from a belonging of the requester.

Moreover, the requester authentication section 120 reads the authentication criterion corresponding to the received title from the access level storing section 160. Then, the requester authentication section 120 performs authentication processing of the requester using the received authentication criterion. In this case, the requester authentication section 120 performs the authentication processing based on the ID number of the requester and the information stored on the accessible person information storing section 110.

Then, when the requester authentication section 120 authenticates the requester as the accessible person, the access level setting section 130 reads the access level information corresponding to the title of the requester from the access level storing section 160. Then, the access level setting section 130 sets the access level to the personal information level indicated in the access level information. Accordingly, the access level setting section 130 sets the access level to the access level corresponding to the title of the requester. According to this example, appropriate level of the personal information can be disclosed according to the title of the requester.

FIG. 14 is a table indicating yet another example of the data stored on the access level storing section 160 in the present alternative. In this example, the access level storing section 160 stores a plurality of access level information in association with the ID number of each accessible person. The plurality of access level information may indicate different personal information levels from each other. Moreover, the access level storing section 160 stores the authentication criterion in association with each access level information. Each authentication criterion indicates the lower limit of the credibility of the authentication.

Moreover, in this example, the requester authentication section 120 supplies the computed credibility of the authentication to the access level setting section 130. The access level setting section 130 receives a plurality of authentication criteria corresponding to the ID number of the accessible person, which is identical to the ID number of the requester, from the access level storing section 160. Then, the access level setting section 130 compares the credibility computed by the requester authentication section 120 with each authentication criterion, and selects the authentication criterion less than the computed credibility.

Then, the access level setting section 130 reads the access level information corresponding to the selected authentication criterion from the access level storing section 160. Accordingly, the access level setting section 130 selects a personal information level of which the corresponding authentication criterion is less than the credibility of the authentication computed by the requester authentication section 120. Then, the access level setting section 130 sets the access level to the sum of the selected personal information levels. In this way, when the requester authentication section 120 authenticates the requester by the authentication criterion or a criterion stricter than the authentication criterion, the access level setting section 130 determines the personal information level corresponding to the authentication criterion as at least a part of the access level.

Hereafter, operation of the owner's IC card 100 will be exemplary explained. In this example, the access level storing section 160 stores a plurality of levels C, D and E in association with the ID number 002 of the accessible person. Moreover, the access level storing section 160 stores lower limits 90%, 20% and 40% as authentication criteria corresponding to the plurality of levels C, D and E, respectively.

Therefore for example, when the ID number of the requester is 002, the access level setting section 130 sets the access level to some or all of the levels indicated in the access level information corresponding to the accessible person whose ID number is 002. For example, when the credibility computed by the requester authentication section 120 is 50%, the access level setting section 130 selects the levels D and E corresponding to 20% and 40%, which are authentication criteria less than 50%. Then, the access level setting section 130 sets the access level to the sum of the level D and the level E. Moreover, when the credibility computed by the requester authentication section 120 is 30%, the access level setting section 130 sets the access level to the level D corresponding to 20%, which is the authentication criterion less than 30%.

Here, there is the personal information having high sensitivity and importance which is to be disclosed after performing strict authentication, such as medical information. On the other hand, some personal information has low sensitivity and importance and can be disclosed with simple authentication. Moreover, in the authentication using a physical characteristic, if one's face resembles others', for example, it may be difficult to authenticate with one hundred percent credibility.

Therefore, when the authentication for disclosing the personal information is performed by the uniform authentication criterion regardless of the kind of the information, authentication may become excessively simple or strict. However, according to this example, the appropriate strictness of the authentication can be set according to the kind of the information. Accordingly, the access level can be changed according to the credibility of the authentication. According to this example, personal information can be protected appropriately.

As described above, according to the present invention, there is provided the information storing apparatus for setting the access level for the information for the requester of the information, and for preventing a person without authority to impersonate a person with authority to acquire the information.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An authentication processing and information storing apparatus performing requester authentication processing and storing thereon personal information of the owner, comprising:

personal information storing circuitry storing thereon the personal information of the owner, which is disclosed to a predetermined accessible person of a plurality of predetermined accessible persons upon authentication;

accessible person information storing circuitry storing thereon accessible person characteristic information of each predetermined accessible person indicating a physical characteristic of each predetermined accessible person; wherein at least one of the plurality of predetermined accessible persons is someone other than the owner;

requester authentication circuitry receiving requester characteristic information indicating a physical characteristic of a requester who requests the personal information of the owner, and performing authentication processing of the requester using the requester characteristic information and the accessible person characteristic information stored on said accessible person information storing circuitry wherein if a computed correlation between the requester characteristic information and the accessible person characteristic information is greater than or equal to a predetermined reference value, the requester is authenticated as a predetermined accessible person;

access level setting circuitry setting an access level, which is a level of the personal information to be disclosed to the requester, when said requester authentication circuitry authenticates the requester as the accessible person;

personal information output circuitry outputting a part of the personal information stored on said personal information storing circuitry to the requester in accordance with the access level set by said access level setting circuitry; and image capturing circuitry for generating the requester characteristic information by capturing an image of the requester while the information storing apparatus is retained by the owner.

2. The authentication processing and information storing apparatus as claimed in claim 1, further comprising access level storing circuitry storing thereon a personal information level, which is a level of the personal information to be disclosed to the accessible person, in association with each of the plurality of the accessible persons, wherein said access level setting circuitry sets the access level to the personal information level corresponding to the accessible person when said requester authentication circuitry authenticates the requester as the accessible person.

3. The authentication processing and information storing apparatus as claimed in claim 1, further comprising access level storing circuitry storing thereon a personal information level, which is a level of the personal information to be disclosed to the accessible person, and an authentication criterion, which is strictness of the authentication to be performed when the personal information within the personal information level is disclosed, in association with each other, wherein said access level setting circuitry determines the personal information level corresponding to the authentication criterion as at least a part of the access level when said requester authentication circuitry authenticates the requester by the authentication criterion or a criterion stricter than the authentication criterion.

4. The authentication processing and information storing apparatus as claimed in claim 3, wherein said requester authentication circuitry receives the authentication criterion from said access level storing circuitry, the authentication criterion corresponding to the personal information level for the personal information requested from the requester, and said requester authentication circuitry performs authentication processing of the requester by the authentication criterion.

5. The authentication processing and information storing apparatus as claimed in claim 3, wherein said access level storing circuitry stores the plurality of personal information levels and also stores a lower limit of credibility of the authentication as the authentication criterion corresponding to each of the personal information levels, said requester authentication circuitry outputs the credibility of the authentication for the requester based on the result of the comparison of the requester characteristic information with the accessible person characteristic information, and said access level setting circuitry selects the personal information level of which the lower limit of the corresponding credibility is less than the credibility of the authentication output by said requester authentication circuitry, and sets the access level to the sum of the selected personal information levels.

6. The authentication processing and information storing apparatus as claimed in claim 3, wherein said access level storing circuitry stores the personal information level and the authentication criterion in association with a title of the requester, said requester authentication circuitry further receives the title of the requester from a belonging of the requester, and performs authentication processing of the requester using the authentication criterion by reading the authentication criterion corresponding to the received title from said access level storing circuitry, and said access level setting circuitry sets the access level to the personal information level corresponding to the title of the requester when said requester authentication circuitry authenticates the requester as the accessible person.

7. The authentication processing and information storing apparatus as claimed in claim 1, wherein said accessible person information storing circuitry stores a plurality of accessible person characteristic information of each of the accessible persons, said requester authentication circuitry receives a plurality of requester characteristic information, and performs authentication processing of the requester using the plurality of accessible person characteristic information and the plurality of requester characteristic information.

8. The authentication processing and information storing apparatus as claimed in claim 1, wherein said requester authentication circuitry employs face information as the requester characteristic information and the accessible person characteristic information.

9. The authentication processing and information storing apparatus as claimed in claim 1, wherein said requester authentication circuitry receives the requester characteristic information from a portable apparatus retained by the requester, and said personal information output circuitry outputs the personal information to the portable apparatus retained by the requester and causes the portable apparatus to store the personal information.

10. An authentication processing and information storing apparatus performing requester authentication processing and storing thereon personal information of a owner, comprising:

personal information storing circuitry storing thereon the personal information of the owner which is to be disclosed to a predetermined accessible person of a plurality of predetermined accessible persons upon authentication;

authentication processing circuitry, which is requester authentication circuitry performing authentication processing of the requester using requester characteristic information indicating a physical characteristic of the requester, said authentication processing circuitry receiving a title of the requester from a belonging of the requester, and performing the authentication processing by a predetermined strictness of the authentication corresponding to the title wherein if a computed correlation between the requester characteristic information and the accessible person characteristic information is greater than or equal to a predetermined reference value, the requester is authenticated as a predetermined accessible person;

access level setting circuitry setting a level of the personal information to be disclosed to the requester to a level of the personal information predetermined corresponding to the title when the requester authentication circuitry authenticates the requester as the accessible person;

personal information output circuitry outputting a part of the personal information stored on said personal information storing circuitry to the requester in accordance with the access level set by said access level setting circuitry; and image capturing circuitry for generating the requester characteristic information by capturing an image of the requester while the information storing apparatus is retained by the owner.

11. A computer readable medium containing computer executable instructions for authenticating a requester of personal information, comprising:

storing personal information of a first person, wherein portions of the personal information are respectively associated with a plurality of levels of accessibility;

storing accessor characteristic information of at least one predetermined accessor of the personal information, wherein at least one of the at least one predetermined accessor is someone other than the first person, and wherein the characteristic information indicates at least a physical characteristic of each of the at least one predetermined accessor;

receiving requester characteristic information indicating a physical characteristic of a requester who is requesting access to the personal information;

authenticating the requester by determining whether the requester is one of the at least one predetermined accessors based on the requester characteristic information and the stored accessor characteristic information;

setting an access level for the requester indicating the level of the personal information which the requester is authorized to access;

allowing the requester to access a portion of the personal information corresponding to the access level set for the requester; and generating the requester characteristic information by capturing an image of the requester while the computer readable medium is retained by the first person.

12. The computer readable medium as claimed in claim 11, wherein the at least one predetermined accessor includes a plurality of predetermined accessors, and the method further comprises:

storing a level of the personal information in association with each of the plurality of predetermined accessors, indicating the level of the personal information which each of the plurality of predetermined accessors is authorized to access;

setting an access level for the requester based on the stored level associated with the predetermined accessor whose accessor characteristic information corresponds to the requester characteristic information.

13. The computer readable medium as claimed in claim 11, further comprising:

storing an authentication criterion in association with each of the plurality of levels of the personal information, the authentication criterion indicating a strictness of the authentication to be performed when a requester requests access to a portion of the personal information corresponding to a particular level; and setting an access level for the requester as the level corresponding to the authentication criterion when the requester is authenticated at a strictness level corresponding to the authentication criterion or a criterion stricter than the authentication criterion.

14. The computer readable medium as claimed in claim 13, wherein the requester is authenticated according to the authentication criterion associated with the level corresponding to the portion of the personal information being requested by the requester.

15. The computer readable medium as claimed in claim 13, wherein the authentication criterion corresponds to a minimum correlation between the accessor characteristic information and the requester characteristic information for which the requester will be granted access to the level of the personal information associated with the authentication criterion.

16. The computer readable medium as claimed in claim 13, further comprising:

storing a level of the personal information and an authentication criterion in association with a title of the requester;

receiving the title of the requester from a belonging of the requester;

authenticating the requester based on the authentication criterion associated with the received title; and setting the access level of the requester as the level of the personal information associated with the received title when the requester has been authenticated.

* * * * *